United States Patent Office 2,801,867
Patented Aug. 6, 1957

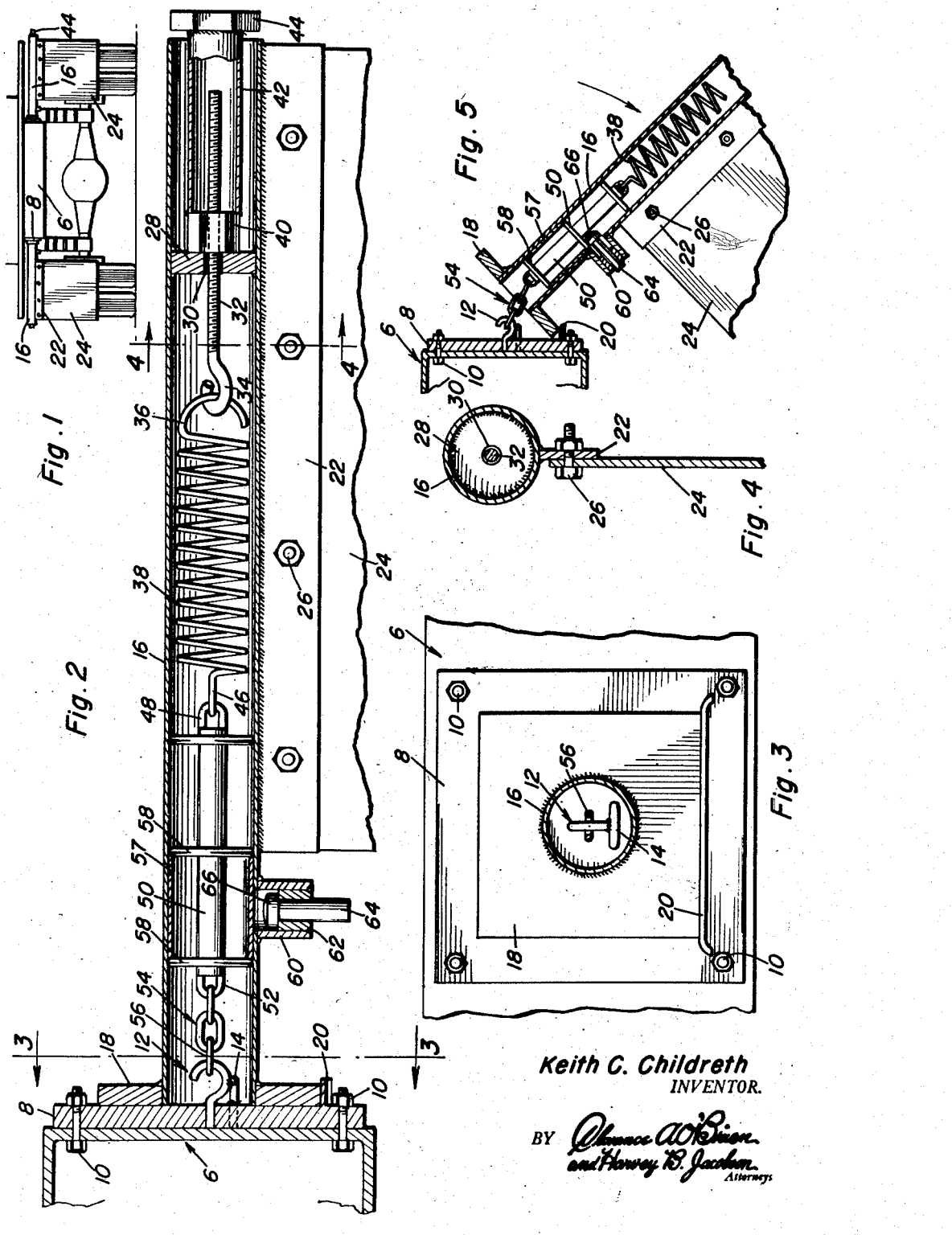

2,801,867

MUD GUARD WITH ATTACHING MEANS THEREFOR

Keith C. Childreth, Medford, Oreg.

Application August 19, 1955, Serial No. 529,481

5 Claims. (Cl. 280—154.5)

The present invention relates to certain new and useful improvements in mud and splash shields such as are used in conjunction with logging vehicles, for example, long trailers, has reference, generally speaking, to apron and flap-type shields; and the object of the invention is to provide improved means for attaching or bracketing a so-called mud flap to the vehicle frame for customary wheel use.

As the preceding general statement of the subject matter of the invention clearly implies, inventions in the field of endeavor under consideration appertain to the form of style of mudguard which is readily attachable and detachable and, after it is attached, is yieldable so that it is capable of moving in various directions to minimize damage while yet retaining the mud flap in its intended position under ordinary driving conditions. Since mud flaps having these characteristics are not new, it may be mentioned that a typical construction which exemplifies the state of the art is disclosed in the Glenn C. Miller Patent 2,652,266 of September 15, 1953.

Another object of the invention is, therefore, to structurally, functionally and otherwise improve upon similarly constructed and performing mud flaps, particularly the means which is employed for attaching the same to the vehicle frame. To this end, attaching means is had which, it is believed, will aptly comply with the requirements of manufacturers and mechanics and with the ordinarily expected needs of vehicle drivers and other users of such flaps.

Briefly, a preferred embodiment of the invention comprises an adapter designed to be securely fixed to a vehicle frame, a chain anchoring hook fixed on and projecting laterally from one face of said adapter, a barrel open at the end adjacent to said adapter and provided at said end with a fixed abutment contacting said adapter, a mud flap carried by and suspended from said barrel, and a spring-biased chain operatively enclosed in said barrel and releasably connected with said hook.

A feature in the construction is the provision of a staple which is fixed on the adapter and underlies the bend of the complemental hook to in this manner brace and stabilize the hook. There is also a flange which is fixed on the adapter and this provides a satisfactory rest or ledge for supporting the abutment and also serves as a sort of a fulcrum when it is desired to apply and remove the attaching means.

More importantly, novelty is predicated on spring means which is operatively housed and protectively arranged in the barrel and which is characterized by a chain joined with the spring by way of a rod and wherein the rod has shoulders to accommodate a projectable and retractable manually usable release latch which functions take the tension off of the coil spring and to allow the chain to have sufficient slack for ready attaching and detaching purposes.

Other objects, features and advantages will become more readily apparent from the following description and the accompanying sheet of illustrative drawings.

In the drawings, wherein like numerals are employed to designate like parts throughout the views:

Figure 1 is a rear end elevation of a logging vehicle showing the improved flaps installed and ready for use.

Figure 2 is a view in section and elevation which illustrates all of the essential details in their construction and arrangement.

Figures 3 and 4 are sections on the lines 3—3 and 4—4 of Figure 2.

Figure 5 is a view on a slightly reduced scale showing, in section and elevation, the manner in which the attaching means may be readily applied and removed.

Reference is had first to Figure 2 wherein the frame of the vehicle is denoted by the numeral 6. The adapter or base plate 8 is simply rectangular and flat faced and is vertically disposed and bolted in position at its corners as at 10. It is provided centrally with a projecting chain anchoring hook 12 and beneath the hook there is a brace. This is a simple staple or the like 14 which is secured to the plate and which has its bight portion underlying and fixed to the bend of the hook, as perhaps best shown in Figure 3. The hook and staple project telescopically into the adjacent open end of the imperforate cylindrical barrel 16. The open end is provided with a rectangular abutment plate or collar 18 which has its lower edge resting on the ledge flange 20 in the manner shown. The flange facilitates attaching and detaching the barrel in the approximate manner illustrated in Figure 5. The abutment is like a collar and it is centrally apertured with the end of the barrel extending therethrough and welded in place as shown in Figure 3. The barrel is provided on its bottom with a depending flange 22 to which the flap 24 is bolted or otherwise fastened as at 26. The opposite end of the barrel is also open and inwardly of this end there is a partition 28 suitably fixed in place and having a central hole 30 for the threaded shank 32 of a hook bolt. The hook 34 is connected to a suitably bent coil 36 at one end of a coil spring 38. The bolt extends through and beyond the hole to accommodate a nut 40 fixed to the inner end of a turning sleeve 42 having a flat-faced nut or head 44 on the outer end which is exposed so that it may be handled with a tool in an accessible and convenient manner. The opposite end of the coil spring has a similar bend or coil 46 connected with an eye 48 on one end of a reciprocable rigid rod 50. There is an eye 52 on the opposite end of the rod to which the attaching chain 54 is connected. The link 56 of the chain is releasably connectible with the hook 12. This rod is provided at longitudinally spaced points with welded or otherwise secured washers 58 which constitute shoulders, one of which comes into play in the manner illustrated in Figure 5 when attaching and detaching the device. There is an opening in the bottom of the barrel and a neck 60 is fixed to the barrel and lined up for the opening and is provided interiorally with a short bushing 62 in which the latch pin 64 is slidably mounted. The latch pin has a head 66 at its upper end which is projectable and retractable in relation to the hole in the barrel. Normally, the weight of the pin and the forces of gravity serve to hold the pin in a down or released position. It is possible, however, to place a finger against the bottom of the pin and to shove it up so that the latching head is in the position illustrated in Figure 5. It is necessary to angle the barrel into the position shown in the last-named figure in order to place slack on the chain and to facilitate hooking the chain in position or releasing it from the hook in a generally obvious manner. The bolt 32 and means 40, 42 and 44 cooperating with the partition 28 makes it possible to vary the tension of the spring whenever necessary or desired. The adjustable tension device housed in the barrel is of significant importance as is clear, as it is inside the tubing and free from damage. Loggers will endorse this type of construction as it makes it possible to tension the spring in winter when mud on the flap is apt to make it heavy. The latch for easy removal is also a significant feature since it is necessary to apply and remove the flap for repairing the truck. Also, it is desirable to take off the flap when logging on private grounds and to attach it when travelling on a public road. The device is not apt to become clogged with mud or damaged from rough handling.

The two washers 58, 58 at the left of the rod 50 are encased in a sleeve 57 serving as a guard and prevent improper operation of the latch pin 64, as shown. All logging trailers are loaded on the truck and hauled back to the woods. When they get to the woods, they take the brackets off the truck and snap them on the trailer. By using two sets of base plates they can get by with one set of brackets.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a mud flap construction, an open-ended barrel, a coil spring confined in the central portion of said barrel, means also confined in said barrel at the accessible end of the latter for adjusting and thus tensioning said spring, an attaching chain, and a rigid rod also in said barrel and connected at one end to an adjacent end of said spring and connected at its opposite end to the inner end of said chain, said rod having at least one washer fixed thereon and slidable in said barrel, said barrel having an opening and a depending neck, a bushing fixed in said neck and providing a seat, and a latch pin slidable in said bushing and having a head on its upper end projectable into said barrel in the path of operation of said washer.

2. In a mud flap construction, in combination, an open-ended barrel, a coil spring confined in said barrel, means also confined in said barrel and situated at an accessible open end of the barrel for adjusting and thus tensioning said spring, a barrel attaching chain, a rigid sleeve slidable in said barrel, said sleeve being operatively connected at one end to an adjacent end of said spring and also being connected to said chain, said sleeve having at least one shoulder which is also slidable in said barrel, said barrel having a latch pin hole therein and a rigid neck depending from the barrel in alignment with said hole, and a push-button type latch pin operatively mounted in said neck and manually projectable in the barrel by way of said hole, whereby the upper end of the pin may be releasably engaged with said shoulder in a manner to temporarily take tension off said coil spring.

3. The structure defined in claim 2 and wherein said sleeve normally closes said latch-pin hole in a manner to prevent improper operation of said latch-pin.

4. A mud flap construction comprising a rigid barrel open at its opposite ends, a coil spring confined in the central portion of said barrel, manually regulatable means confined in one end portion of said barrel and having a portion exposed through one open end of the barrel whereby said means may be operatively connected with an adjacent end of the coil spring for purposes of adjusting and thus tensioning said spring, a chain located for operation in the opposite open end portion of said barrel and adapted to be connected with relatively stationary anchoring means, a rod confined in said barrel and providing an operating connection between said chain and spring, at least one shoulder mounted on said rod, said barrel having a latch-pin hole therein and a rigid neck depending from the barrel in alignment with said hole, a gravity lowerable and manually liftable push-button type latch-pin operatively mounted in said neck and projectable into the barrel by way of said hole so that the upper end of the pin may be releasably engaged with said shoulder in a manner to temporarily take tension off said coil spring, and sleeve means concentrically mounted on said rod and slidable in the bore of said barrel and normally situated over and covering said latch-pin hole.

5. A mud flap construction comprising, in combination, a flat adapter plate adapted to be vertically bolted on a vehicle frame, a chain anchoring hook fixed centrally to said plate, a horizontal flange fixed to and projecting from the lower portion of said plate, said flange having its ends terminating inwardly of the vertical marginal edges of said adapter plate, a horizontal barrel at right angles to said plate and open at the end adjacent to said plate, said hook projecting into said barrel by way of said open end, a flat rectangular abutment plate encircling and fixed to the last-named end of said barrel and firmly abutting said adapter plate with its lower marginal edge only resting atop and supported by said flange, a coil spring operatively housed in said barrel, a chain releasably connected with said hook, an operating connection between one end of said chain and the adjacent end of said coil spring and provided with a shoulder for temporarily taking the tension off said coil spring, a projectable and retractable manually usable normally released latch pin slidingly and permanently mounted on said barrel and adapted to releasably engage and retain said shoulder in a predetermined position, said latch pin being projectable into said barrel in the path of sliding movement of said shoulder by way of an opening in the barrel with which it registers, and guard means mounted on said operating connection, normally covering said opening, and preventing said latch pin from being improperly operated.

References Cited in the file of this patent

UNITED STATES PATENTS

| 2,296,789 | Johnson | Sept. 22, 1942 |
| 2,652,266 | Miller | Sept. 15, 1953 |